Feb. 28, 1967  A. A. TINAJERO  3,306,389
PITCH AND ROLL CONTROL FOR GROUND EFFECT MACHINES
Original Filed March 23, 1962
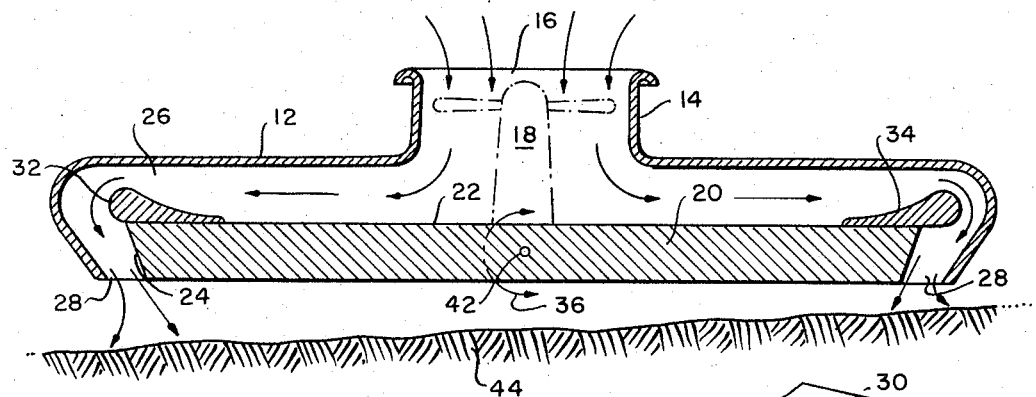
FIG. 1.
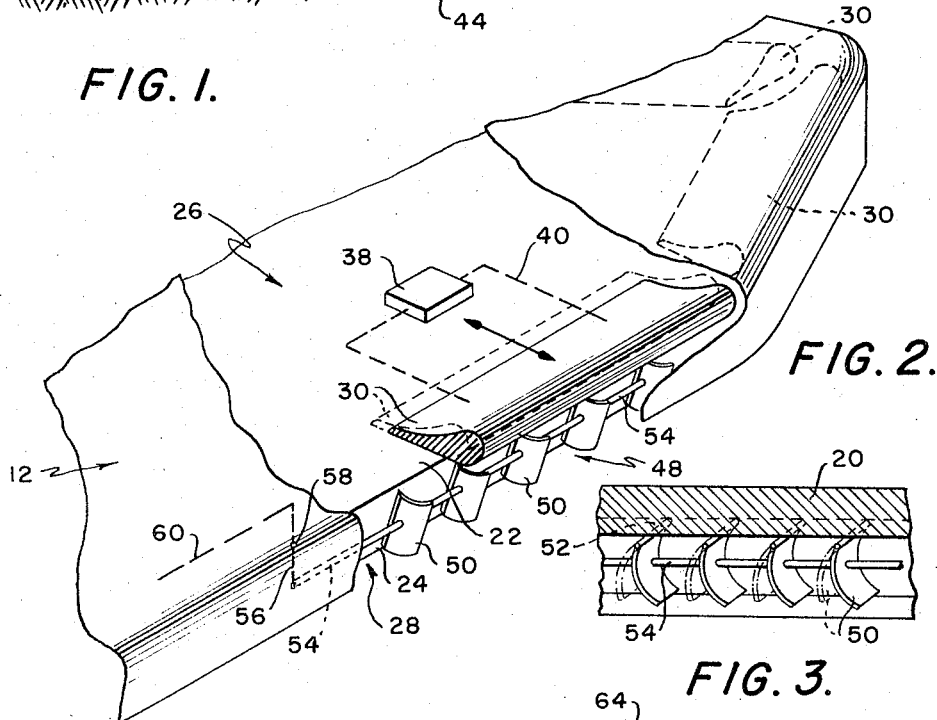
FIG. 2.
FIG. 3.
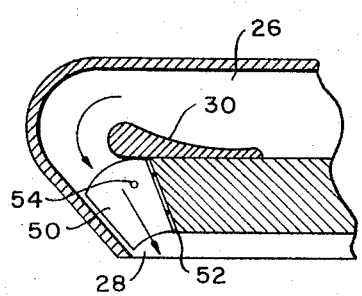
FIG. 4.
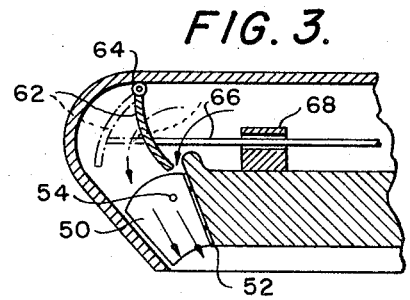
FIG. 5.
INVENTOR
ANIBAL A. TINAJERO
BY *Hodges*
ATTORNEY United States Patent Office 3,306,389
Patented Feb. 28, 1967

3,306,389
PITCH AND ROLL CONTROL FOR GROUND
EFFECT MACHINES
Anibal A. Tinajero, 1310 N. Meade St.,
Arlington, Va. 22209
Original application Mar. 23, 1962, Ser. No. 182,144, now
Patent No. 3,279,553, dated Oct. 18, 1966. Divided
and this application Oct. 21, 1965, Ser. No. 508,629
4 Claims. (Cl. 180—7)

The invention described herein may be manufactured and used by or for the Government of the United States of America for governmental purposes without the payment of any royalties thereon or therefor.

This application is a divisional application of applicant's co-pending application Serial No. 182,144, filed March 23, 1962, now Patent No. 3,279,553.

This invention relates to controls for vehicles of the ground effect machine type, and more particularly to controls for varying the pitch, roll motion, and orientation of vehicles of the ground effect machine type having peripheral nozzles.

In some of the prior art methods for controlling the pitch, roll, and direction of forward motion of ground effect machines, compressed air as discharged from slots or louvers located on the sides of the vehicle for the single purpose of producing an imbalance in pressure beneath certain portions of the vehicle. In other prior systems in which vehicles have a plurality of air compressors, control is achieved by moving one section of the vehicle acted on by air of a different pressure than the air acting on another portion of the vehicle.

In the former of the above-mentioned systems a disadvantage is that power is wasted because the ejected compressed air is utilized to implement only the pitch or roll, and the air used therefor does not carry out the additional function of aiding in the lifting of the vehicle. Moreover, ejecting air from nozzles located at the sides of the vehicle in such a system requires complicated control linkages and additional ducts.

A major disadvantage in the latter systems is that the reaction time, that is, the time lag between the actuation of the control mechanisms and the actual effect brought about by the control, is large because a relatively long time is necessary to increase the rotational speed of the air compressor. When the controls are actuated by an operator in the vehicle, the large time lag reduces the sensitivity of the entire control system so that it is very difficult to sense within a reasonable time the effects of the controls which have been actuated. Moreover, the use of additional air compressors requires additional expense and additional controls therefor.

According to the present invention in one of its forms, a vehicle of the ground effect machine type having peripheral nozzles located in the bottom of the vehicle for directing air to an area beneath the vehicle, is provided with means located interiorly of the vehicle for the control of the local jet momentum of the air discharged thereat. The aforesaid means may comprise, for example, a movable air restricting member, the position of which in the discharging air stream is variable to produce pitch or roll, and forward or side propulsive thrust of the vehicle due to the imbalance air pressure beneath selected portions of the vehicle.

When the vehicle is inclined from the horizontal, a directional force component in the horizontal plane is produced due to the component of the weight of the vehicle displaced in that direction; and this horizontal force component may be utilized to propel the vehicle in said direction, or, the component of weight may be counteracted by the horizontal component of the difference in air pressure beneath the vehicle to maintain the vehicle in a horizontal plane over an undulating surface.

It is, accordingly, an object of the present invention to provide in a vehicle of the ground effect machine type having peripheral jet nozzles to provide a vehicle movement control to which the vehicle responds quickly, whereby an operator may obtain a "feel" of the implemented control.

It is another object of the present invention to provide in a ground effect machine having a peripheral nozzle control means therefor to vary the orientation of the vehicle relative to a horizontal plane without interference with other control means of said vehicle which may be used to rotate or turn said vehicle.

Another object of this invention is the provision of control means in a vehicle of the ground effect machine type having a peripheral nozzle wherein the flow of air at high pressure is restricted at certain portions of the peripheral nozzle in order to produce a pressure differential at selected portions beneath the vehicle.

Yet another object of the present invention is to provide in a vehicle of the ground effect machine type having peripheral jet nozzles, control means for compensating for undulating surfaces over which the vehicle may traverse, there being provided at the same time through said control means a control of the direction of forward motion of said vehicle.

A feature of the present invention is that the control means provided for varying the pitch and roll orientation of the vehicle may be actuated simultaneously with the actuation of other control means such as, for example, turning vanes for rotational and translational movements of the vehicle in the horizontal plane, thereby enabling coordinated turns and yaw movements of the vehicle.

The foregoing and other objects, features and advantages of the present invention will be better understood by referring to the accompanying drawings in which:

FIG. 1 is a view in cross-section of a vehicle of the ground effect machine type having peripheral jet nozzles incorporating the control system according to the present invention;

FIG. 2 is a modified cut-away view in perspective illustrating the control means according to the present invention;

FIG. 3 is a modified top view of the cut-away portion of FIG. 2;

FIG. 4 is a view of a transverse cross-section of the control means shown in FIG. 2; and FIG. 5 is a view in cross-section of an embodiment of the control apparatus according to the invention.

Referring to the drawings in which like numerals are used to indicate the same or similar parts in the various figures, FIG. 1 shows a vehicle of the ground effect machine type comprising a hollow body 12 having an open bottom and at the top a raised portion 14 defining an opening or duct 16 into which air surrounding the vehicle is forced by means of an air compressor 18. A flat box-like member or frame 20 having smooth continuous top 22 and canted sides 24 is located within the body 12 in spaced relationship therefrom to thereby form an interior space 26 between the duct 16 and the open bottom of the body 12. The space between the sides 24 of the frame 20 and the bottom of the body 12 forms a peripheral nozzle 28 around the bottom periphery of the vehicle, the periphery being of any suitable shape used in such vehicle. It is understood that air drawn into the space 26 by the fan 18 is discharged at high pressure from the nozzle 28 beneath the vehicle to provide a cushion of air to support the vehicle 12, the flow of the air being indicated by arrows in FIG. 1.

Mounted around the edge of the top surface 22 of the frame 20 is a plurality of edge-wise-spaced slidably-mounted blocks 30 of which blocks 32 and 34 are shown in the cross-sectional view of FIG. 1. The blocks 32 and 34 have faired or curved upper surfaces in order to present minimum resistance to the flow of air in the space 26.

As indicated by the oppositely pointed arrows in FIGS. 1 and 2, each of the blocks 30 is slidably movable back and forth horizontally on the surface 22 of the frame 20 to selectively restrict portions of the nozzle 28. In FIG. 1 the block 34 is shown in a position restricting the size of the interior space 26 and, therefore, reducing the amount of air flowing to that portion of the nozzle 28 in substantially direct flow correspondence therewith. The blocks 30 may be moved by any suitable means, and that shown in FIG. 2 is a conventional servo-motor 38 actuating push rods 40 connected to each of the blocks.

As shown in FIG. 1, the block 34 of the blocks 30 is adjusted to a position to restrict the size of the nozzle 28 on one side of the vehicle 12 and the block 32 on the opposite side of the vehicle 12 is positioned not to obstruct or restrict the size of the nozzle 28 thereat so as to permit a maximum or greater flow of air therepast in the space 26 through the nozzle 28 as compared to the flow past block 34.

The numeral 42 indicates the center of gravity of the vehicle, and the numeral 44 indicates the ground or surface over which the vehicle may be passing. When the blocks 32 and 34 are in the positions shown in FIG. 1, due to the greater jet momentum of air flowing past the block 32, a moment of force is created about the center of gravity 42, and the vehicle rotates clockwise to some extent in a vertical plane about the center of gravity 42 as indicated by the arrow 36. This rotating is with respect to the surface of the ground it is traveling over.

Another important advantage of the adjustment of the blocks 30 resides in the fact that the vehicle can be kept horizontal when it is traversing a piece of ground 44 that is uneven and is, say, increasing in height toward the right as shown in FIG. 1. By suitable adjustment of the blocks 32 and 34, the vehicle 12 is positioned horizontally because the jet momentum is less past the block 34 than past the block 32, and since the vehicle is closer to the surface 44 at the end thereof having the block 34, less air pressure is necessary therebeneath to maintain a ground effect air cushion thereunder. The difference in air-flow past the blocks 32 and 34 adjusted as shown in FIG. 1 also imparts a force to the vehicle tending to move or translate it to the right in FIG. 1. Accordingly, instead of adjusting the pitch or roll of the vehicle to accomplish horizontal orientation thereof, the speed and direction of forward motion of the vehicle may be controlled by restricting the flow of air through a portion of the nozzle 28 by adjustment of selected blocks 30. Thus, both orientation and translation of the vehicle 12 may thus be accomplished by adjusting the blocks 30 to restrict the discharge of air from the nozzle 28 in appropriate selected portions thereof.

As shown in FIG. 2, an additional control means 48 for rotation or turning the vehicle includes a plurality of air-flow-directing cascaded turning vanes 50, each of said turning vanes 50 being rotatable in the nozzle 28 about an axis 52 parallel to the canted sides 24 of the frame 20. Each of the turning vanes 50 may be suitably rotatably mounted, as by hinges parallel to the canted sides 24 of the frame 20 and the turning vanes 50 may be mounted in end-to-end cascaded groups around the vehicle 12 in the peripheral nozzle 28. A push rod 54 is suitably fastened to each of the turning vanes 50 of a cascaded group thereof to rotate each of said vanes 50 about each of the axes 52. The push rod 54 is linked to a lever 56 rotatable about a pivot 53, the lever 56 being driven by a suitably actuated control rod 60. Other suitable means may be used to rotate the turning vanes 50.

The purpose of the turning vanes 50 is to controllably deflect the air discharged from the peripheral nozzle 28 to obtain varying components of thrust including a zero component in the horizontal plane to produce a moment of force to rotate the vehicle, or a combination of thrust and moment to turn the vehicle in the horizontal plane. Of course, other types of nozzle-mounted turning vanes may be used in conjunction with the pitch and roll controlling blocks 30 of the invention as long as the turning vanes do not extend into the path of movement of the blocks 30. Thus according to the invention, the turning vanes 50 may be moved simultaneously with the movement of the blocks 30, thereby enabling the vehicle to be directed along a path that may continuously vary in directional components of three mutually perpendicular coordinate axes simultaneously.

Instead of utilizing flow-restricting elements such as the blocks 30, as shown in FIG. 5, air-flow restricting vanes 62 of considerably lighter construction than that of the blocks 30 are rotatably mounted to variably restrict air-flow in the interior space 26. Each of the vanes 62 is preferably curved as shown for the smooth flow of air therepast, and they are mounted in spaced end-to-end relationship in the interior space 26 peripherally around the inner surface of the body 12. Each of the vanes 62 is rotatably mounted on a hinge 64 which is suitably secured to the inner face of the outer body 12.

A push-rod 66 is provided for each of the vanes 62 and is mounted to be guided through an aperture in a block 68 mounted on the top surface 22 of the frame body 20. One end of each of the push-rods 66 is suitably connected to the outer end of one of the vanes 62 to vary the rotational position thereof and may be actuated in any suitable manner. The edge of the frame body 20 may be faired for smooth air-flow in the interior space 26 between the vanes 62 and the frame 20.

When the curved vanes 62 are rotated to engage the inner surface of the body 12 at one end, a maximum amount of air-flow is produced therepast. The flow of air to the nozzle 28 is reduced by moving the end of the vanes 62 closer to the edge of the frame 20. The movement of the vanes 62 does not interfere with the movement of the turning vanes 50, thus enabling simultaneous control of both for the purpose of simultaneously producing components of vehicle movement continuously in three mutually perpendicular coordinate axes.

The vehicle may be controllably deviated about the line of direction of forward motion of the vehicle by varying the positions of the vanes 50 to turn or rotate the vehicle and simultaneously by varying the positions of selected ones of the blocks 30 to lower (or raise) one side of the vehicle. Thus, simultaneously with carrying out turning movements, any portion of the vehicle may be raised or lowered according to the operator's skill in conformity with undulations in surface of water or land over which the vehicle is traversing. Or, if desired, by controlling the air pressure under selected regions of the vehicle, the orientation of the vehicle may be maintained in a horizontal plane despite undulations of the surface of water or ground over which the vehicle may be traversing.

The over-all effect of utilizing the light-weight and therefore, quickly responsive controls, according to the invention is to provide the operator of the vehicle with a sense of "feel" in controlling the vehicle as it traverses over land or water, thereby enabling a pilot operator to develop a handling skill comparable to that he may develop in other types of vehicles.

It is to be understood that the control apparatus according to the invention is not limited to utilization of vehicles of the ground effect machine type alone, but may be utilized in conjunction with the control of aircraft having a range of operating characteristics including ground effects. Moreover, the orientation and control apparatus of this invention may be used in those types of ground effect machines using other gases for thrust in addition to or exclusive of air.

It should be understood, of course, that the foregoing disclosure relates to only preferred embodiments of the invention, and that it is intended to cover all changes and modifications of the examples of the invention herein chosen for the purposes of the disclosure, which do not constitute departures from the spirit and scope of the invention.

What is claimed is:

1. Control apparatus for a ground effect machine of the type wherein a nozzle is located around the periphery of the underside of the machine, and wherein there is provided ducted fan means mounted on the machine for producing air at high pressure to be discharged from said peripheral nozzle comprising:
   (a) an outer body for said machine, the interior surface of said outer body forming an air-confining wall for the nozzle;
   (b) an inner frame body located interiorly of said outer body in spaced relationship therefrom, the sides of said inner frame body forming another air-confining wall for said nozzle;
   (c) a plurality of movable bodies each body being in the form of a block having a flat side in sliding engagement with the top surface of said frame body and having a curved surface in contact with air flowing toward said nozzle, said upper surface being streamlined in the direction of air flow and curving concavely upwardly and then convexly outwardly, downwardly and inwardly to said flat side whereby the air flowing thereover is directed with a smooth streamlined flow into said nozzle;
   (d) means coupled to each of said bodies for selectively positioning said bodies to variably restrict the flow of air to at least a portion of said nozzle;
   (e) whereby conditions of reduced air pressure may be produced in selected regions beneath said machine for producing pitch and roll thereof relative to the ground.

2. Apparatus according to claim 1 including:
   (a) a plurality of turning vanes, each of said vanes being rotatably mounted below the plane of the flat surface of said movable bodies in said nozzle.

3. Apparatus according to claim 2, including:
   (a) control linkage means mounted on said inner frame body and positioned to move freely of said movable bodies and of said means for controlling said movable bodies for selectively varying the degree of rotation of at least some of said control vanes independently of the movement of said movable bodies;
   (b) whereby said turning vanes may be employed either by themselves to effect a simple rotation, or together with said movable bodies to produce coordinated turns.

4. In a vehicle of the ground effect type having a hollow outer body and a frame member located in spaced relation therefrom to form an inner space wherein gas is directed at high velocity through said interior space and is discharged through a downwardly and inwardly canted nozzle located around the periphery of said vehicle to produce within and beneath the approximate peripheral confines of said vehicle a gas at higher pressure than that of the atmosphere, apparatus for controlling the spatial orientation of said vehicle with the ground comprising:
   gas-flow controlling means mounted peripherally of the vehicle and movable at substantially all portions of said interior space to vary the amount of flow of gas thereat;
   said gas-flow controlling means comprising a plurality of movable elements, each of said elements comprising a body having a flat surface slidable on the upper surface of said frame member and a curved upper surface in contact with the gas flowing in said interior space, said upper surface being streamlined in the direction of the gas-flow and curving concavely upwardly and then convexly outwardly, downwardly and inwardly to said flat surface whereby gas flowing thereover is directed with a smooth streamlined flow into said nozzle;
   said element being slidably mounted for movement on said frame member at its associated portion of said space to variably reduce the gas flow to a portion of said peripheral nozzle in substantially direct flow correspondence therewith.

References Cited by the Examiner

UNITED STATES PATENTS

| | | | |
|---|---|---|---|
| 3,130,939 | 4/1964 | Alper et al. | 180—7 |
| 3,150,732 | 9/1964 | Walker | 180—7 |
| 3,162,260 | 12/1964 | Cockerell | 180—7 |
| 3,181,636 | 5/1965 | Cockerell | 180—7 |

A. HARRY LEVY, *Primary Examiner.*